United States Patent [19]

Betteridge et al.

[11] Patent Number: 4,595,607
[45] Date of Patent: Jun. 17, 1986

[54] COMBINED INDUCTION HEATING AND COATING SYSTEM FOR PIPE WELD JOINTS

[75] Inventors: John W. Betteridge, Essex, England; Milburn L. Hart, Tulsa, Okla.; Gregory H. Carlson, Tulsa, Okla.; Ronald E. Carlson, Sr., Tulsa, Okla.

[73] Assignee: Resource Engineering and Manufacturing Corp., Tulsa, Okla.

[21] Appl. No.: 762,626

[22] Filed: Aug. 5, 1985

[51] Int. Cl.[4] ............................................. B05D 1/24
[52] U.S. Cl. .................................... 427/185; 118/307; 118/308; 118/310; 118/316; 118/323; 118/620; 427/195; 427/196; 427/197; 427/327
[58] Field of Search ............... 427/327, 185, 195, 196, 427/197, 181–182; 118/307, 308, 310, 316, 323, 620

[56] References Cited

U.S. PATENT DOCUMENTS

| | | | |
|---|---|---|---|
| 3,108,022 | 10/1963 | Church | 427/182 |
| 3,218,184 | 11/1965 | Lemelson | 427/182 |
| 3,946,125 | 3/1976 | Scheiber | 427/182 |
| 4,237,817 | 12/1980 | Hurt et al. | 118/310 |
| 4,308,819 | 1/1982 | Hart | 118/307 |

Primary Examiner—Norman Morgenstern
Assistant Examiner—Janyce A. Bell
Attorney, Agent, or Firm—William S. Dorman

[57] ABSTRACT

An apparatus and method for heating and coating a section of a pipe comprising a plurality of induction type heaters supported in spaced circumferential relation around the pipe section, the heaters having relatively flat and hollow induction coils therein, the coils of the induction heaters being oriented in a cylindrical surface adjacent to, and parallel with, the surface of the pipe, a coating dispenser mounted between a pair of induction heaters for dispensing a coating material on the surface of the pipe, the heaters and dispenser being rotated as a single assembly around the pipe while simultaneously applying an alternating electric potential to the induction heaters to heat the pipe to a suitable application temperature for a coating material, the coating material being applied to the thus-heated pipe through the dispenser while continuing to rotate the assembly, water being passed through the copper coils to keep them cool during the heating of the pipe.

9 Claims, 9 Drawing Figures

COMBINED INDUCTION HEATING AND COATING SYSTEM FOR PIPE WELD JOINTS

BACKGROUND OF THE INVENTION

1. Field of the Invention

This invention relates to a process and apparatus (system) which can be used as a new method for the preheating and coating of pipe weld joints with a coating material which should be heated to a predetermined temperature for its proper adhesion to the pipe. In the case of a powdered epoxy material, for example, this desired temperature would be the fusion and/or curing temperature. In case of liquid coating materials, this temperature could be the curing temperature or, sometimes, simply the temperature at which the material will flow readily over the pipe surface. More particularly, this invention involves an arcuate or circumferential, rotatable yoke which is adapted to be mounted on a pipe or pipeline in order to heat the underlying area of a weld joint so, that, when a coating material is applied immediately thereafter, the coating material will reach the proper application temperature. The present system differs from the circular coil now popularly used for this task in that the heater elements are not themselves wrapped around the pipe in the form of a coil or coils, but arranged as a plurality of separate, longitudinally-oriented induction heaters spaced around the pipe above the surface thereof parallel to the longitudinal axis of the pipe; since the powder applicator is also mounted on the same supporting ring for the heaters, the system provides a method whereby the weld joint can be heated and coated (even simultaneously, if desired) without the need for moving the supporting ring longitudinally along the pipeline.

2. Prior Art

A preliminary search was conducted on the present invention and the following patents represent the results of the search:

| Patentee | U.S. Pat. No. | Issue Date |
| --- | --- | --- |
| Hughes | 4,388,510 | June 14, 1983 |
| Fugill | 2,180,513 | November 21, 1939 |
| Wright | 2,596,636 | May 13, 1952 |
| Williamson | 2,715,171 | August 9, 1955 |
| Suelen et al | 2,743,345 | April 24, 1956 |
| Wokas | 3,188,440 | June 8, 1965 |
| Reinke | 3,359,398 | December 19, 1967 |
| Preyer | 3,354,514 | January 12, 1971 |

Hughes U.S. Pat. No. 4,388,510 (owned by the assignee of the present invention) merely shows one type of circular induction coil for heating the area of a weld joint on a pipeline.

Fugill et al U.S. Pat. No. 2,180,513 shows another form of a circular induction coil for relieving stesses in welds on a pipe.

Wright U.S. Pat. No. 2,596,636 shows a dielectric heating apparatus which can be manipulated in the manner of a flat iron and which is supported on roller-type electrodes 9. Whereas this reference shows a primary winding 5 and a secondary winding 8 which receive high frequency energy (much higher than that of the present invention), the heating takes place in the capacitive portion of the circuit.

Williamson U.S. Pat. No. 2,715,171 is considered to be pertinent in a general sense, but the pipe "A" to be heated has to fit between the side conductor 12 and be in a position adjoining the central conductor 16. The conductor 16, however, is hollow so that cooling water can be circulated therethrough. Also, the conductor 16 is covered with a stack of thin flat laminations 17 which are similar to the ferrous plates employed in the present invention.

Seulen et al U.S. Pat. No. 2,743,345 shows a wheeled heater supported on rollers 4 around a concave recess 3 in which a cylindrical workpiece, such as a pipe, may be disposed. The heating circuit includes a heating conductor loop 6 including a conductor 9 (see FIG. 4), and two lead sections 10. These current carrying members are copper tubes through which cooling water is allowed to flow. It appears that item 11 is a plurality of yoke laminations as referred to in column 3, lines 66 through 68. This reference apparently relates to low frequency induction heating.

Wokas U.S. Pat. No. 3,188,440 is described as a high frequency inductor assembly. In column 2, lines 48 through 50 it is stated that the inductor can be readily applied to an inductor assembly of the type shown in Seulen et al U.S. Pat. No. 2,743,345 which was discussed above. Items 16 and 17 are guides. The entire inductor assembly 10, as shown in FIG. 2, is supported from a housing 57 by means of bars 56. The housing 57 is supported on a carriage 58 having wheels 59 which engage a track 60. Wokas is obviously dealing with an apparatus which is totally different from the present invention as far as structure and operational capability are concerned. Wokas, however, does disclose hollow copper pipes through which cooling liquid is allowed to flow and also U-shaped laminations on the side conductors 23 and 24.

Reinke et al U.S. Pat. No. 3,359,398 shows liquid cooled hollow conductors 1 arranged to form a closed conductor loop extending across the cylindrical surface of a workpiece 5 and carrying laminated iron yokes 6.

Preyer U.S. Pat. No. 3,554,514 shows a device for inductively heating and hardening of the crank pin of a crankshaft.

SUMMARY OF THE INVENTION

The present invention provides a system for first heating and then coating the weld joints of a pipe which has been made up from pipe sections welded together in end-to-end relation. These pipe sections have been previously coated at the mill, except for the ends, which as indicated above, are welded together in the field. The apparatus of the present invention includes an articulated yoke which is adapted to encircle a pipe or pipeline over the area of a weld joint. The yoke itself consists of an upper yoke section and two side yoke sections which pivot or swing with respect to the upper yoke section. The two side yoke sections can be locked together at the bottom to complete the closure of the yoke around the pipe. Various wheels, pulleys, and belts are mounted on the sides of the yoke so that that apparatus can be rotated 180° in either direction for a purpose which will hereinafter appear.

Mounted on the yoke are, for example, two banks of induction heaters. In opposite spaces between the two banks of heaters are two powder applicators. Although the powder applicators are not new per se, the fact that they are mounted on the same yoke or ring with the induction heating means is believed to be novel. (Other types of coating applicators could also be used in the present invention.) Stated differently, the heating operation can proceed and be completed; thereafter, the coating operation can continue without requiring any longitudinal movement of the yoke along the pipe. Also, under certain circumstances, the heating operation can continue, albeit on a moderate basis, even during the coating operation.

Each bank of heaters consists of a plurality of induction heating units. Each induction unit includes a copper coil which is wound in a cylindrical plane parallel to the central longitudinal axis of the pipe. This arrangement is to be distinguished, first of all, from the conventional helical induction heating coil which has surrounded the pipe helically in the past. Each copper coil is hollow and is surrounded by a plurality of thin flat sheets of silicon-iron which constitute a magnetic core for the copper coil. The purpose of the magnetic core is to direct or concentrate the induction heating effect towards the pipe which is to be heated. In the embodiment disclosed herein, each bank of heaters includes, for example, six individual induction heating units arranged in series. As indicated above, the copper tubes are hollow and are connected in series so that water can flow through the six units of each heater bank in series to cool the copper coils. The copper coils are suitably electrically insulated from the structure upon which they are mounted. An electrical current is allowed to pass through the six heating units of each heater bank in series. As disclosed herein, and purely for the purpose of example, the voltage across each heater bank is preferably about 150 volts; the frequency of the electric current is preferably about 800 cycles (or hertz) although it could be from between 1000 and 1500 hertz, for example, or any other suitable frequency. The power source should be capable of delivering about 1400 amperes of current. Although the individual induction heating units of each heater bank are connected in series, preferably the two heater banks themselves are connected in parallel across the electrical power source.

The main frame of the yoke is made essentially of aluminum. The side sections of the heater banks are made from phenolic (or equivalent) material which is electrically non-conductive and, of course, non-magnetic. Except for the flux plates, or magnetic core, which surround the copper coils, it is preferable to avoid the employment of any magnetic materials in the region of the induction heating units. In accordance with the specific description of the invention which follows, some of the wheel shafts (for the pulleys) which pass adjacent the induction heating units are made from stainless steel which is non-magnetic. Brass rods and brass nuts are employed to hold the flux plates in position. Care must be taken to prevent the copper tubes from coming into contact with any elements which are electrically conductive. Some of the components of the heater units, however, are made of aluminum (non-magnetic) where the copper coils can be properly insulated with respect to such aluminum structural elements. The specific materials referred to herein are merely illustrative; equivalent materials can be employed where desired.

The coating applicators and the means for supplying a powder suspension to the coating applicators is broadly the same as that shown in Hart U.S. Pat. No. 4,371,295. The electrical power supply for the copper coils is broadly the same as that disclosed in Hughes U.S. Pat. No. 4,388,510.

When the yoke of the present invention is properly positioned and secured around the pipeline in the area of the weld joint to be coated, the coating applicator system and the electrical induction heating system are properly energized and the yoke is powered for rotation 360° to either side of the initial position of the yoke. Electrical power is supplied to the induction coils and the yoke commences to rotate in a given direction around the pipe. When the yoke has moved the required number of degrees, direction of movement is reversed so it can traverse back to the original position and if desired, beyond. Thus, the yoke rotates back and forth during the heating operation. If it is desired to coat the weld joint with an epoxy material, then of course the powder suspension system is adapted to provide such an epoxy powder. Under these conditions the pipe is preferably heated to a temperature of about 450° F. which would probably take between three and five minutes. At this time the electrical power to the induction heating units is cut off and the powder dispensers are allowed to dispense epoxy powder to the pipe joint while the yoke is still rotating with respect to the pipe. The coating time would normally be between thirty and forty-five seconds. Under some circumstances it might be desirable to maintain a lower power on the induction heating units to maintain the heat on the pipe during coating.

It if is desired to use the present invention in connection with a polyethylene coating, it would be necessary to heat the pipe joint to a temperature of approximately 600° F. and then to apply a polyethlene coating up to about a $\frac{1}{8}$ inch thickness. The time for applying such a polyethylene coating might take up to as much as fifteen minutes. Accordingly, it is contemplated that a maintenance type of heating could be employed during the coating process. Lower power is applied to the heating units during the latter part of the coating process when using the polyethlene.

DETAILED DESCRIPTION OF THE PREFERRED EMBODIMENTS

Figure 1:
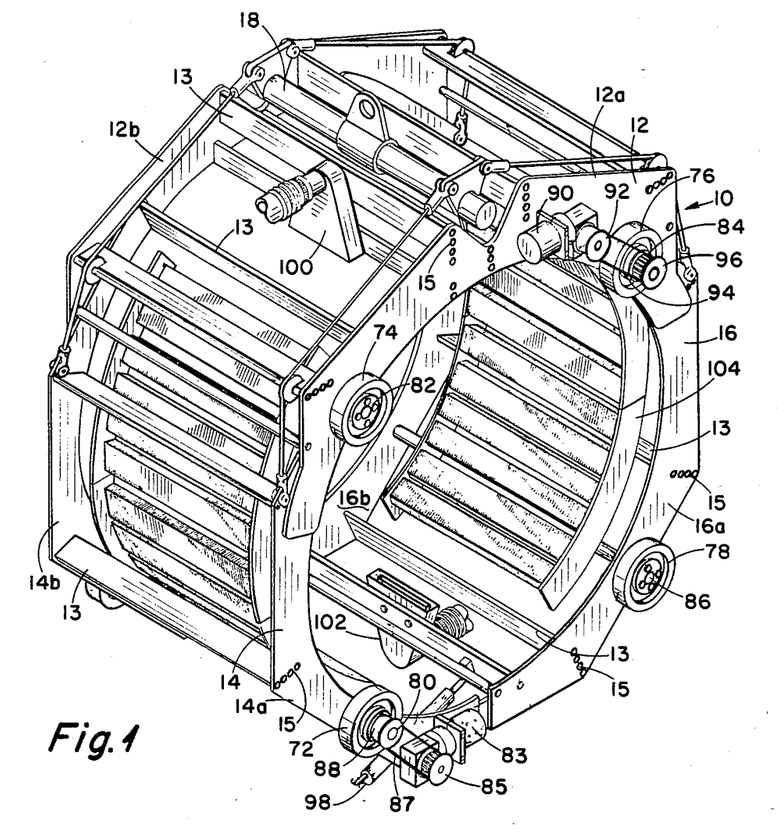
FIG. 1 is a perspective view of a circular yoke embodying the features of the present invention.

Referring to the drawings in detail, FIG. 1 shows a yoke 10 which is similar to the yoke shown in FIG. 4 of Hart U.S. Pat. No. 4,371,295 issued on Feb. 1, 1983. Yoke 10, which is essentially an aluminum frame, is divided into three main sections: an upper section 12, and side sections 14 and 16.

Upper yoke section 12 is provided with a forward plate 12a of aluminum and a rear plate 12b also of aluminum; these plates are maintained in spaced parallel relationship by means of cross bars or plates 13, which are also of aluminum. Left hand yoke section 14 is formed from a forward plate 14a and a rear plate 14b, both of aluminum. These are also held in spaced apart parallel relationship by means of aluminum bars or plates 13. The right hand yoke section 16 is formed of a forward plate 16a and a rear plate 16b, both of aluminum. Likewise, these plates 16a and 16b are held apart in spaced parallel relation by means of aluminum plates 13.

The ends of the aluminum plates 13 are held against their respective yoke plates by means of screws 15, which pass through suitable holes in the side plates of the yoke sections and are received in threaded holes in the ends of the cross members 13. These screws 15 are preferably of aluminum, brass, or non-magnetic stainless steel.

Figure 2:
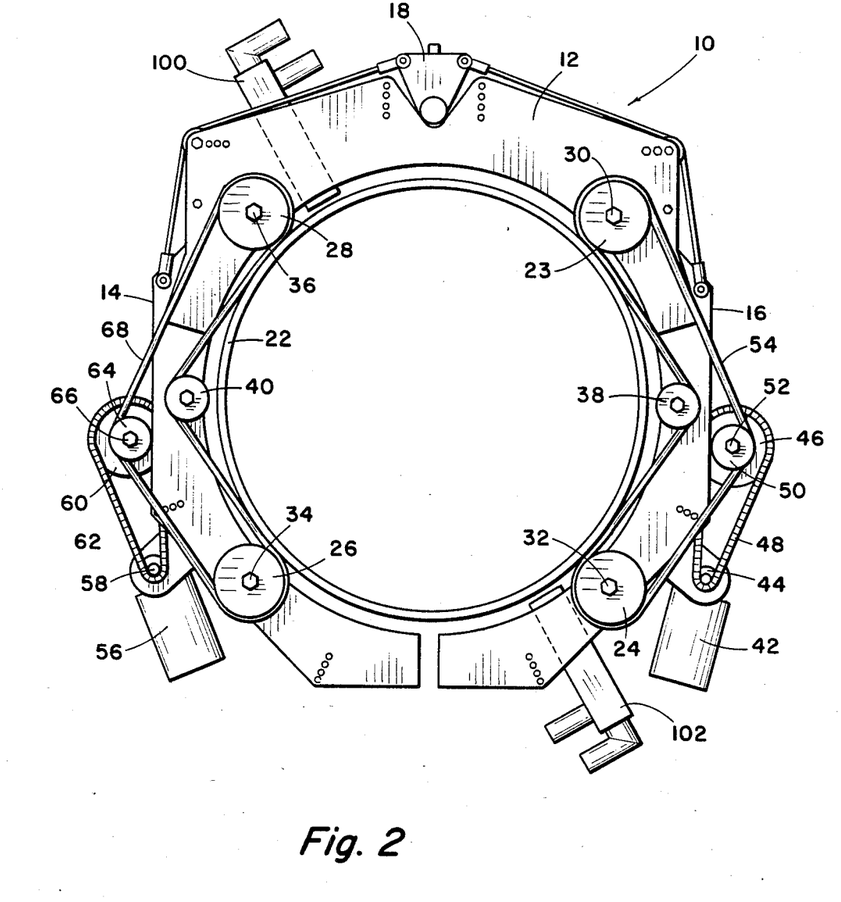
FIG. 2 is a right hand end view of the structure shown in FIG. 1, showing the pipe in section and a modified form of drive for rotating the yoke around the pipe.

The yoke is provided with a lifting means 18, which can be connected to a hook 20 for the purpose of lifting the yoke 10 from around the pipe 22, shown in FIG. 2. The means for rotating the yoke 10 around the pipe as shown in FIG. 2, is broadly similar to the corresponding means shown in FIG. 4 of the aforementioned Hart U.S. Pat. No. 4,371,295.

Briefly, the rotating system shown in FIG. 2 comprises pulley wheels 22, 24, 26, and 28 mounted on axles 30, 32, 34, and 36, respectively. These axles are preferably made from stainless (non-magnetic) steel. Although four such pulleys are shown in FIG. 2, it should be understood that four identical pulleys, similarly numbered, are located on the opposite side of the axles 30, 32, 34, and 36. Idler pulley 38 is mounted on the yoke section 16 with a similar pulley (not shown) mounted on the opposite side; an idler pulley 40 is mounted on the frame section 14 with a similar pulley (not shown) mounted on the opposite side of the frame section 14.

A motor 42 is mounted on the frame section 16 and drives a sprocket 44 which, in turn, drives a larger sprocket 46 through a chain 48. A pulley 50 is mounted on the same shaft 52 which supports the sprocket 46. A belt 54 passes around the pulleys 22 and 24 and the smaller pulleys 38 and 50 as shown. The inner surface of the belt 54 contacts the surface of the pipe 22 so as to provide one part of the system for rotating the yoke 10 around the pipe. On the left side, a similar arrangement is shown for completing the driving of the sprocket of the yoke 10 around the pipe 22. The similar system includes a motor 56, a sprocket 58 driven by the motor, a larger sprocket 60 driven from the sprocket 58 by a chain 62, and a small pulley 64 mounted on the same shaft 66 as the sprocket 60. A belt 68, similar to the belt 54, is adapted to pass around the pulleys 26, 28, 40, and 64, as shown. The inner surface of the belt 68 contacts the outer surface of the pipe 22. It should be understood that pulley and belt arrangements are located on the opposite side of the yoke from that shown in FIG. 2, so that a pair of belts 68 and a pair of belts 54 contact the outer surface of the pipe 22 to drive the yoke 10 circumferentially around the pipe 22, in a manner later to be described.

Figure 3:
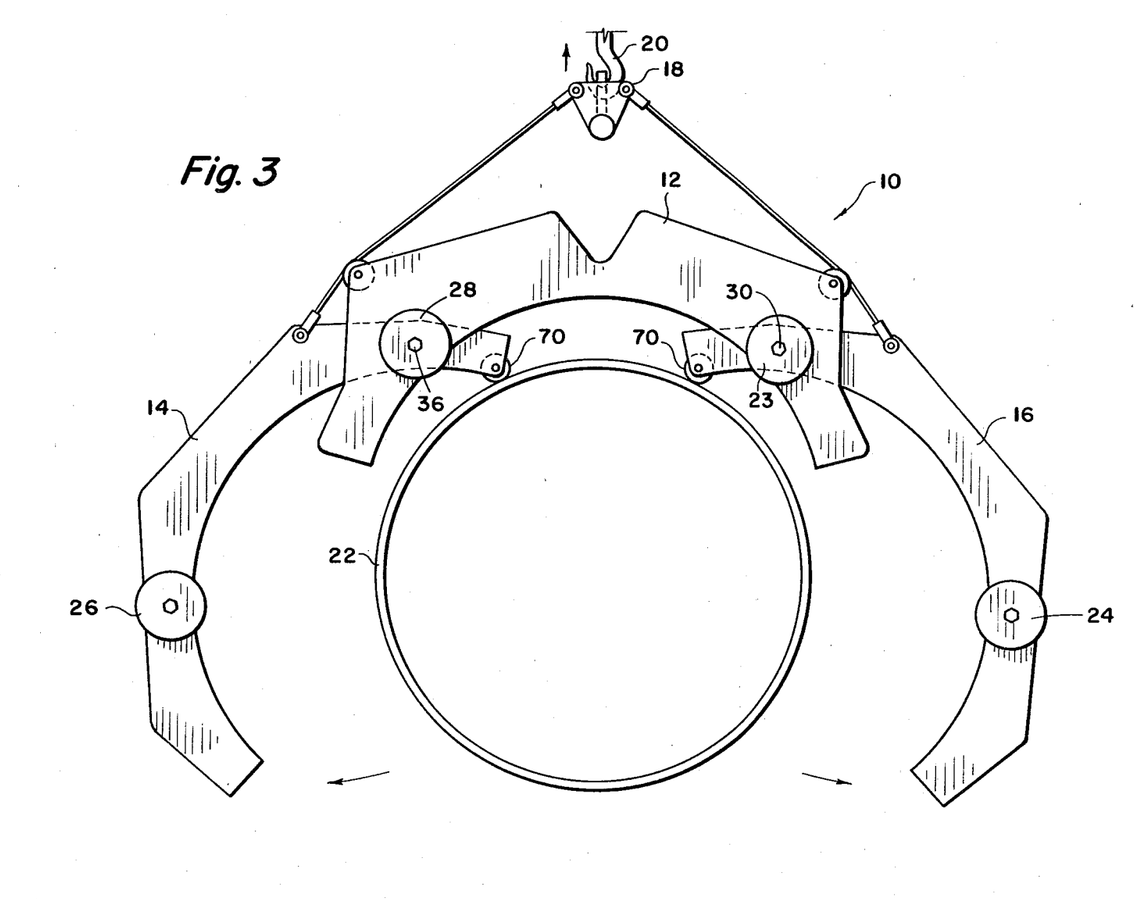
FIG. 3 is a simplified semi-diagrammatic view similar to FIG. 2, but showing the yoke in an open position for removing the same from around the pipe.

Referring now to FIG. 3, the yoke section 16 pivots with respect to the upper yoke section 12 around the shaft 30 for the pulleys 22. Similarly, the yoke section 14 pivots with respect to the upper yoke section 12 around the shaft 36 for the pulleys 28. The inner ends of the yoke sections 14 and 16 are provided with small rollers 70 to facilitate the removal of the yoke from, and its placement on, the pipe 22.

Returning to FIG. 1, the means for rotating the yoke 10 with respect to the pipe is somewhat different from that shown in FIG. 2. Four wheels or rollers 72, 74, 76, and 78 are spaced around the circumference of the pipe, and are mounted on stainless steel (non-magnetic) axles 80, 82, 84, and 86, respectively. It should be understood that similar wheels 72, 74, 76, and 78 are mounted on the opposite ends of the axles 80, 82, 84, and 86 but would not be visible in FIG. 1.

Shaft 80 is driven by motor 83 mounted on yoke section 14; the motor 82 drives a pulley 85 which, in turn, drives a belt 87 which goes around another pulley 88 on the axle 80. Thus, motor 83 drives the wheel 72 and a wheel 72 (not shown) on the opposite side of the axle 80. A similar motor 90 is mounted at the right hand end of the upper yoke section 12 for driving the axle 84; more particularly, the motor 90 drives a small pulley 92, which, in turn drives the belt 94 which goes around a small pulley 96 on the axle 84. Thus, motor 90 drives the wheel 76 which is visible in FIG. 1 and also an opposite wheel or roller 76 mounted on the other end of the axle 84 but which does not appear in FIG. 1.

The yoke sections 14 and 16 of FIG. 1 are pivotally mounted with respect to the upper yoke section 12 in manner similar to that shown in FIG. 3. Thus, yoke section 14 pivots with respect to the upper yoke section 12 around the axle 82; similarly, the yoke section 16 pivots with respect to the upper yoke section 12 around the axle 84.

A locking means 98 (see FIG. 1) is provided for holding the yoke sections together in their circumferential arrangement around the pipe in a manner similar to the locking mechanism shown in FIGS. 7 and 8 of Hart U.S. Pat. No. 4,005,677, issued Feb. 1, 1977; more particularly, this locking mechanism would be similar to the elements shown in the lower portion of FIG. 7 of the aforementioned U.S. Patent. Alternatively, this locking mechanism could be similar to the locking mechanism 46 shown in the lower portion of FIG. 4 of Hart U.S. Pat. No. 4,371,295 issued on Feb. 1, 1983, and comprising the elements 60, 62, 64, 66, and 67. For the sake of simplicity, the locking means 98 is not illustrated in FIGS. 2 and 3.

FIGS. 1 and 2 show two powder dispensing devices 100 and 102, which are broadly the same as the powder dispensing elements 14 and 16 shown on FIG. 4 of Hart U.S. Pat. No. 4,371,295. Also, the system for providing the powder suspension to the powder dispensers 100 and 102 is broadly the same as the powder dispensing system disclosed in the aforementioned U.S. Pat. No. 4,371,295 to Hart.

An arcuate heating bank or section 104 is mounted on the yoke section 16 as shown in FIG. 1. Similarly, an arcuate heating bank or section 106 is also mounted on the yoke section 14. The arcuate heating section 106 is shown in greater detail in FIG. 4.

Referring now to FIGS. 4 through 9, the details of the arcuate heating section 106 will now be described, it being understood that this description applies equally to the arcuate heating section 104. The heating section 106 is comprised of a pair of arcuate side members in the form of phenolic plates 108 and 110. When the term "phenolic" is employed, it should be understood that any other suitable electrically non-conductive material could also be used. These arcuate plates 108 and 110 are held in spaced apart parallel relation by means of six aluminum cross plates 112 whose ends are secured to the arcuate members 108 and 110 by means of screws 114 which could be made of copper, brass, aluminum, or other non-magnetic material, including non-magnetic stainless steel, if desired.

Figure 4:
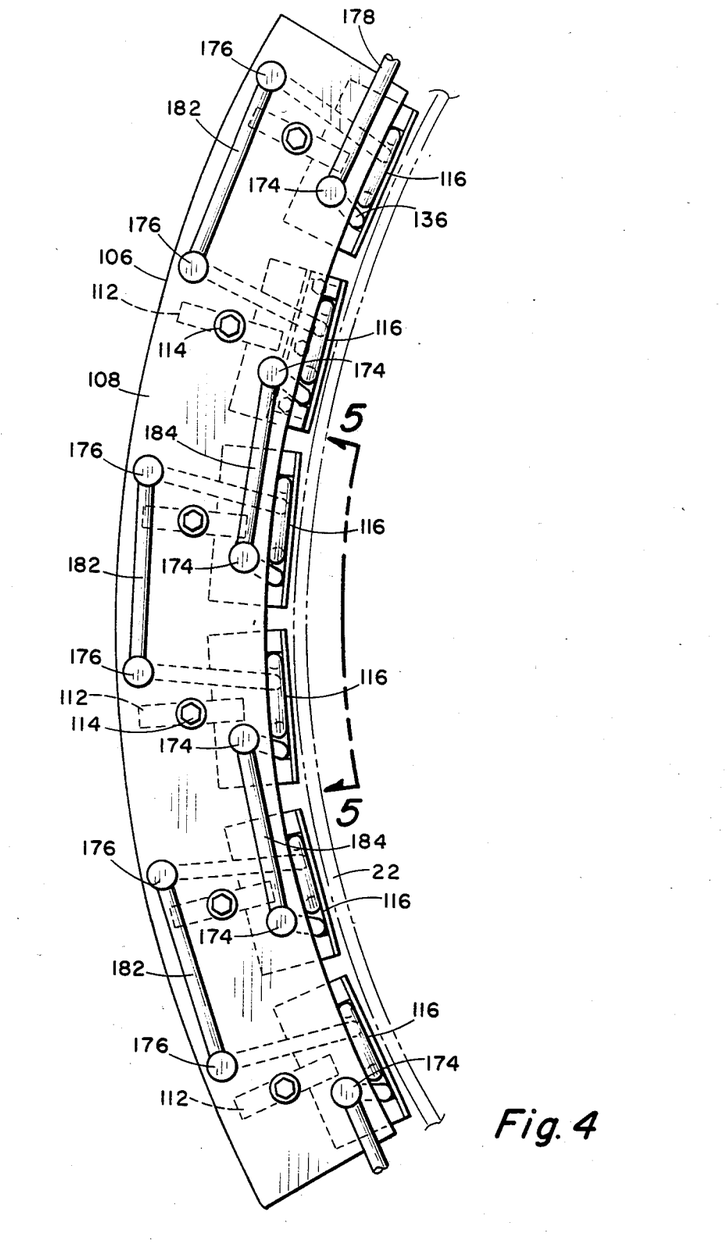
FIG. 4 is an end view of a portion of the internal ring shown in FIG. 1, depicting six flat-pack units.

A plurality of induction heating units 116 are mounted between the side plates 108 and 110 so as to be relatively close to the outer surface of the pipe 22, as best shown in FIG. 4. These heating units 116 will hereinafter sometimes be referred to "flat packs" so as to distinguish them from the conventional circular or helical induction heating coils heretofore employed for the same general purpose; one such helical heating coil is shown in Hughes U.S. Pat. No. 4,388,510 issued on June 14, 1983.

Each flat pack induction heating unit 116 (see now FIG. 8) is composed essentially of a continuous hollow copper coil 118 wound in a rectangular pattern so as to extend longitudinally in a cylindrical plane or surface parallel to the longitudinal central axis of the pipe 22. More particularly, the hollow copper coil includes two outer hollow copper tubes 120 and 122 and two inner hollow copper tubes 124 and 126. The outer copper tubes 120 and 124 are connected together at the right hand ends by means of hollow copper elbows 128 and a hollow copper nipple 130. The right hand ends of the inner copper tubes 124 and 126 are similarly connected together by means of hollow copper elbows 128 and a short hollow copper nipple 132. The left hand end of the inner copper tube 124 is connected to the left hand end of outer copper tube 122 by means of copper elbows 128 and intermediate hollow copper nipple 134. The left hand end of outer copper tube 120 is connected to a copper tube section 136 which extends upwardly (or outwardly) at right angles to the heating unit 116. Likewise, the left hand end of the inner hollow copper tube 126 is connected to an upwardly extending hollow copper tube 138 which is essentially parallel to the extension 136.

Figures 8, 9:
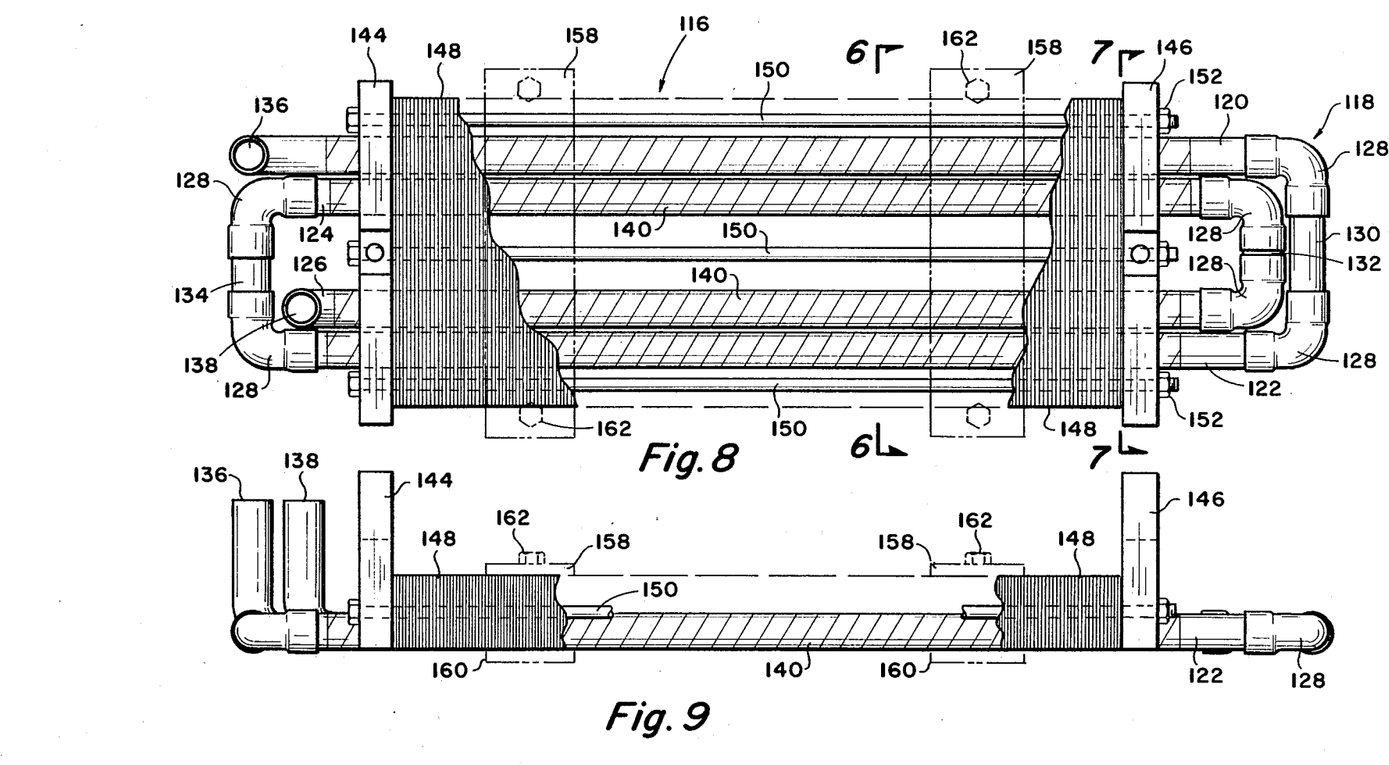
FIG. 8 is a view of one of the flat-pack units taken from the opposite direction as in FIG. 5, or looking towards the pipe.
FIG. 9 is a front view taken from FIG. 8.

If, for example, one were to introduce water into the upper opening of the copper pipe 136, it would flow through copper tube 120, through copper tube 122, through copper tube 124, through copper tube 126, and then upwardly and outwardly through the vertical copper tube 138. If one were to attach electrodes, or a source of electrical voltage, to the upper ends of the tubes 136 and 138, electrical current would pass through the copper tubes in the same manner as the water described above.

Figure 5:
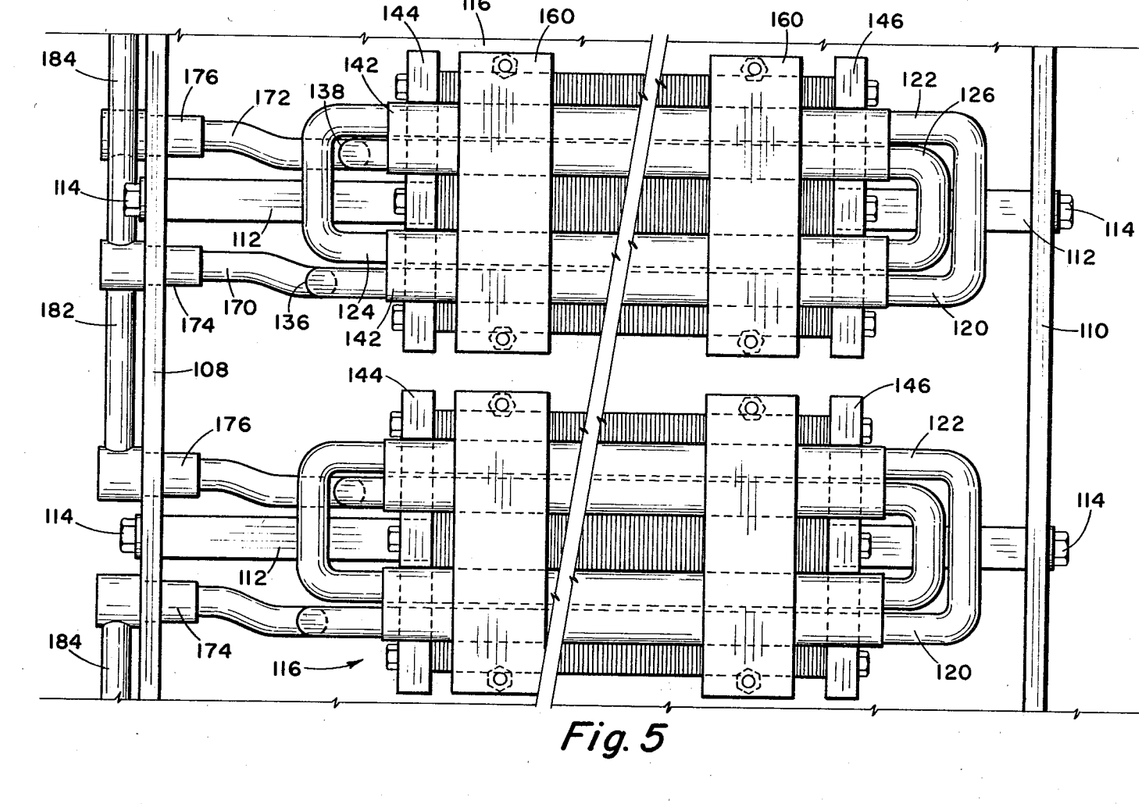
FIG. 5 is a view taken along line 5—5 of FIG. 4 showing the details of two flat-pack units as they would appear looking outwardly from the pipe.

As will hereinafter appear, it is necessary to keep the individual copper tubes 120, 124, etc. insulated from each other and from some of the necessary supporting metallic structure which is used to position these tubes. Therefore, it is necessary to coat or wrap the copper tubes with some type of insulating material. As shown in FIGS. 8 and 9, the tubes are preferably wrapped with insulating tape 140. As shown in FIG. 5, additional wrapping 142 can be provided around adjacent pairs of copper tubing. The hollow copper tubes extend through and beyond end plates 144 and 146 which are made of aluminum, phenolic, or other non-magnetic material. In the instance where these plates are made of aluminum material, care must be exercised to wrap the copper tubes properly where they pass through these plates so as to prevent electrical contact between the tubes and the side plates.

Between the side plates 144 and 146, and arranged over the copper tubes, are a plurality of parallel flux plates 148 constituting a laminated core for the copper tubes. These flux plates 148 are very thin flat plates of silicon-iron and are of the type that one would normally find in electrical transformers. In any event, these flux plates 148 extend between the side plates 144 and 146 and are held in position by brass clamping rods 150 which pass through suitable holes in the end plates 144 and 146 and through suitable holes in the flux plates 148. Brass nuts 152 at the right hand ends of the rod 150 secure them in place.

Figure 6:
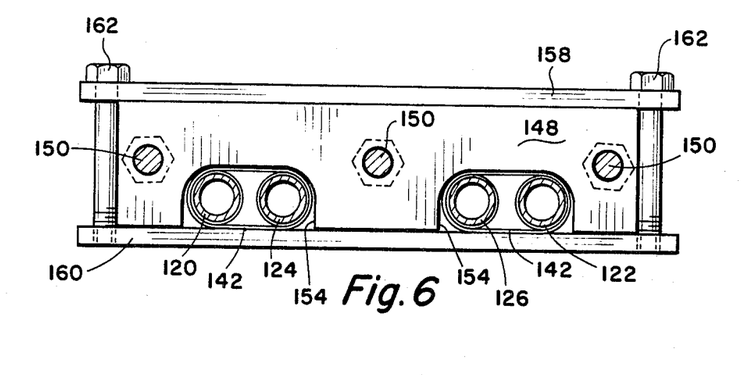
FIG. 6 is a cross-sectional view through one of the flat-pack units looking along section line 6—6 of FIG. 8.
Figure 7:
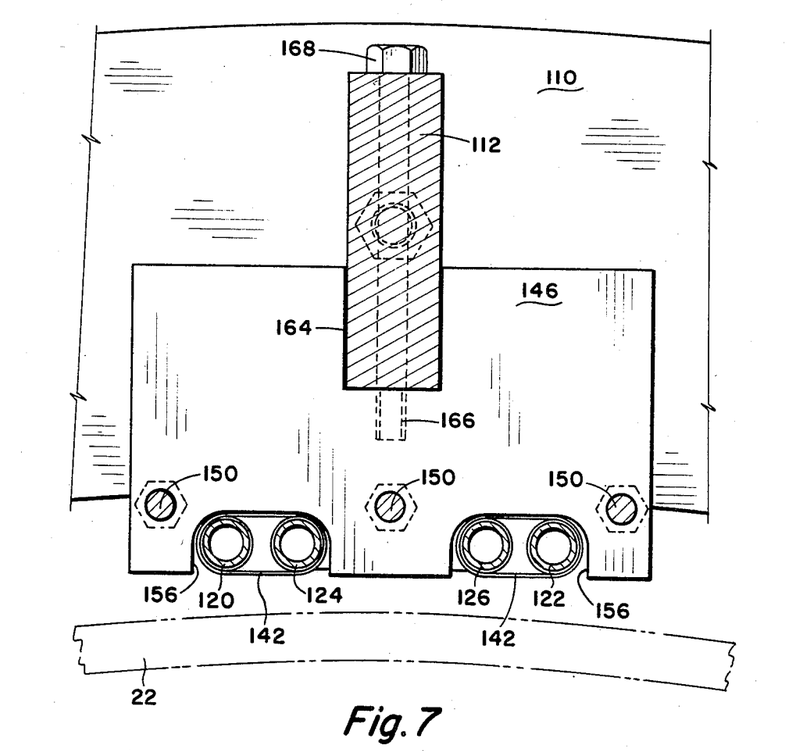
FIG. 7 is a cross-sectional view through one of the flat-pack units looking along section line 7—7 of FIG. 8.

As best shown in FIG. 6, the lower ends of the flux plates 148 are provided with openings 154 to accomodate adjacent pairs of copper tubes. For example, the tubes 122 and 126 are received in the left hand opening 154 and the tubes 120 and 124 are received in the right hand opening 154. Likewise, the end plates 144 and 146 (see FIG. 7) are provided with openings 156 which are similar to the openings 154. In order to hold the copper tubes in the openings 154, a "sandwich" structure is located adjacent to each end plate 144 or 146. This "sandwich" structure includes a pair of spaced parallel plates 158 and 160 arranged above and below the top and bottom sides, respectively, of the flux plates 148. These plates or strips 158 and 160 are preferably made of phenolic or aluminum or other non-magnetic material. The plates 158 and 160 are held together by means of screws 162 which must also be of non-magnetic material.

For the purpose of connecting the heating units 116 to the side members 108 and 110, each end plate 144 or 146 (see now FIG. 7) is provided with a central rectangular notch 164. A threaded hole 166 is located at the bottom center of each notch 164 and an elongated screw 168 extends downwardly through an appropriate vertical hole in the cross member 112 so that the lower end of this screw 168 engages the threaded hole 166. Again, this elongated screw 168 is of aluminum, brass, or other non-magnetic material.

Turning now to FIGS. 4 and 5, it is necessary to bring the copper coils to the outside of the arcuate phenolic plate 108 in order to provide a continuous path for the passage of water and electric current through the heating elements of the arcuate section 106. To this end, the right angle extensions 136 and 138 (shown in FIGS. 8 and 9) are connected to horizontal copper tubes 170 and 172, respectively. Copper tubing 170 connects with a copper fitting 174 which extends through the plate 108. Similarly, the copper tubing 172 connects with a copper fitting 176 which also extends through the plate 108. The same considerations hold true for all of the heating units 116 which are secured between the plates 108 and 110. Thus, there are a series of copper fittings 176 arranged along the outer periphery of plate 108 and a series of fittings 174 arranged adjacent the inner periphery of the plate 108. The hollow copper fitting 174 on the uppermost heating unit 116 shown in FIG. 4 is connected to an inlet copper tubing 178 and the lowermost fitting 174 is connected to an outlet copper tubing 180. The fitting 176 on the uppermost heating unit 116 is connected to the fitting 176 on the next adjacent heating unit 116 by means of copper tubing 182.

The copper fitting 174 on the unit 116 which is immediately below the top heating unit 116 is connected to the next lower fitting 174 by means of copper tubing 184. With reference to the top of FIG. 4, the copper fittings 176 for the third and fourth units are connected together by means of copper tubing 182 and the copper fittings 176 for the fifth and sixth units are connected together by means of copper tubing 182. The fittings 174 for the second and third units are connected together by means of copper tubing 184, as indicated above; and the copper fittings 174 for the fourth and fifth units are connected together by means of copper tubing 184. Water, for cooling purposes, is introduced through the copper tubing 178 and passes through all of the six units 116 in series and exits from the copper tubing 180. Likewise, one terminal of an electric power source can be connected to the copper tubing 178, and the other terminal, or ground connection, for the power source can be connected to the copper tubing 180. Therefore, the electric current passes in similar fashion in series through the copper coils of the heating units 116 on the heating unit 106. Although the arcuate heating unit 104 has not been described, it should be understood that heating units 116 are mounted thereon in identical fashion to the heating units 106. Water and electric current also pass through the units 116 of the heating section 104 in series for that section, but in parallel with the units of 116 of the heating section 106.

The heating sections 104 and 106 shown in FIG. 1 are connected to the cross members 13 of the yoke sections in any convenient manner (not shown). For example, suitable brackets (not shown) are attached to the cross members 13 in the regions where the plates 108 and 110 pass by, and bolts pass through suitable holes in these brackets and in the plates 108 and 110 to hold each section 104 adnd 106 in fixed relation with respect to its associated yoke section.

Operation

When the yoke structure shown in FIG. 1 or FIG. 2 is placed around the pipe as shown in FIG. 2, a source of water is applied to the pipes 178 of both heating sections 104 and 106 through an electrically non-conductive hose. Likewise, the outlets 180 are connected to non-conductive discharge hoses. The pipes 178 of each heating section 104 and 106 are connected to one terminal of a 150 volt source of electrical energy operating at approximately 800 cycles per second and capable of delivering 1400 amperes of current. The various motors 82 and 90 in FIG. 1 or 42 and 56 in FIG. 2 are connected to a suitable source of electric power such that the yoke structure can rotate 180° in either direction from the position shown in FIG. 2, for example. The rate of rotation and the length of time of rotation can be timed manually or automatically. It should be further understood that the assemblies shown in FIGS. 1 and 2 would be placed over a weld joint in a pipeline which is already coated except for the weld joints themselves. Preferably, the weld joints would have been previously cleaned by sandblasting or the like. If an epoxy coating is to be applied, it would be desired to heat the pipe joint up to a temperature of about 450° F. before applying the epoxy coating. The time required to heat the pipe would generally be about three to five minutes, and the coating time would be between thirty and forty-five seconds. After the pipe has been heated to the desired temperature, the powder suspension can be introduced onto the surface of the pipe through the coating applicators 100 and 102. As stated previously, the system for supplying power to these units would be the same as that shown and described in Hart U.S. Pat. No. 4,371,295.

If it is desired to use the present invention in conjunction with a polyethylene coating, it will be necessary to heat the pipe joint to a temperature of approximately 600° F. over a period of about fifteen minutes, and then to apply a polyethylene coating up to about a ⅛ inch thickness. The time for applying such a polyethylene coating might take up to as much as fifteen minutes. Accordingly, it is contemplated that a maintenance type of heating could be employed during the coating process. That is, by decreasing the voltage applied to the heating sections, or by placing a resistance in series, the heating effect of the flat packs 116 can be reduced to the point of the maintenance requirements.

For the purpose of providing an alternating electrical potential to either heating section 104 or 106, the power supply shown in Hughes U.S. Pat. No. 4,388,510 can be employed. The details of the electrical power supply and the details of the powder supply are not considered to be important as far as the present invention is concerned and thus, reference has been made to the aforementioned patents for the source of supply. Any other convenient electrical power supply capable of meeting the requirements set forth above would be proper under the circumstances. Although the frequency of the electric current has been described in terms of 800 hertz, it should be understood that slightly lower or slightly higher frequencies, such as 1000 to 1500 hertz, or even higher, might be employed. If desired, silicon controlled rectifiers could be used in conjunction with the power supply to provide a more even or constant power source.

What is claimed is:

1. A process for heating and coating a section of a pipe comprising arranging a plurality of induction type heaters in spaced circumferential relation around the pipe section, the heaters having relatively flat induction coils therein disposing the coils of the induction heaters in a cylindrical surface adjacent to and parallel with the surface of the pipe, locating a coating dispenser between a pair of induction heaters for dispensing a coating material on the surface of the pipe, rotating the heaters and dispenser as a single assembly around the pipe while simultaneously applying an alternating electric potential to the induction heaters to heat the pipe to an application temperature for the coating material, continuing to rotate the assembly alternately in opposite rotary directions while heating the pipe, and thereafter applying a coating material through the dispenser to the thus-heated pipe while continuing to rotate the assembly.

2. A process for heating and coating a section of a pipe as set forth in claim 1 wherein the coils are also oriented in a longitudinal disposition with respect to the pipe.

3. A process for heating and coating a section of a pipe as set forth in claim 1 including locating a second coating dispenser on the assembly opposite from the first dispenser and applying coating material to the pipe through the second coating dispenser during the coating application step.

4. A process for heating and coating a section of a pipe as set forth in claim 1 including the step of continuing to apply the electric potential on a reduced basis to the induction heaters during the coating application step to maintain the heated condition of the pipe during coating.

5. Apparatus for heating and coating a section of a pipe comprising an articulated yoke adapted to encircle the pipe, rotating means mounted on the yoke so that the apparatus can be rotated in either direction around the pipe, a plurality of induction heaters mounted on the yoke in spaced circumferential relation, the heaters having relatively flat induction coils therein disposed in a cylindrical surface adjacent to, and parallel with, the surface of the pipe, a coating dispenser mounted on the yoke between a pair of induction heaters for dispensing a coating material on the surface of the pipe, whereby the yoke can be rotated around the pipe while simultaneously applying an alternating electric potential to the induction heaters to heat the pipe to an application temperature for the coating material, and whereby coating material can be applied thereafter to the thus-heated pipe through the dispenser while continuing to rotate the assembly.

6. Apparatus for heating and coating a section of a pipe as set forth in claim 5 wherein said yoke comprises an upper yoke section and two side yoke sections which pivot with respect to the upper yoke section, and locking means for locking the two side yoke sections together at their bottoms to complete a closure of the yoke around the pipe.

7. Apparatus for heating and coating a section of a pipe as set forth in claim 5 wherein the coils are also oriented in a longitudinal disposition with respect to the pipe.

8. Apparatus for heating and coating a section of a pipe as set forth in claim 5 including a second coating dispenser mounted on the yoke opposite from the first dispenser.

9. Apparatus for heating and coating a section of a pipe as set forth in claim 5 wherein each induction coil is a hollow copper coil which is is surrounded by a plurality of thin flat sheets of silicon-iron which constitute a magnetic core for the copper coil, whereby water can pass through the coils to keep them cool during the induction heating of the pipe.

* * * * *